Figure 1:
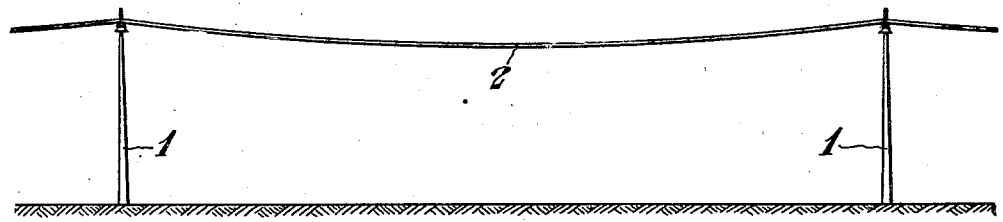

March 23, 1943.  T. F. PETERSON  2,314,798

COMPOSITE ELECTRIC CONDUCTOR STRAND

Filed Aug. 15, 1939

Inventor:
THOMAS F. PETERSON,
by: John E. Jackson
his Attorney

Patented Mar. 23, 1943

2,314,798

UNITED STATES PATENT OFFICE 2,314,798

COMPOSITE ELECTRIC CONDUCTOR STRAND

Thomas F. Peterson, Worcester, Mass., assignor to The American Steel and Wire Company of New Jersey, a corporation of New Jersey Application August 15, 1939, Serial No. 290,294

1 Claim. (Cl. 174—128)

This invention relates to overhead electric transmission lines comprising conductor strands made of three intertwisted wires, this type now being commonly used in carrying out rural electrification projects.

The present application is a continuation-in-part of the application filed June 23, 1937, by Thomas F. Peterson and Evald O. Wahlstrom, bearing Serial No. 149,984.

It is to be understood that rural electric transmission lines are characterized by the use of poles which are spaced greater distances than is normally considered good practice. Economy dictates that these poles be relatively short, it following that the conductors must be strung under relatively high tensions to prevent them sagging too great an extent. Economy also dictates that the conductors be of a relatively inexpensive construction.

A single wire conductor is of such a shape that the wind gives rise to excessive transverse vibration which so stresses the conductor as to cause its premature fracture through fatigue. Two intertwisted wires, through some form of propeller action in the wind, result in torsional vibration, this resulting in the premature failure of this type of a conductor through fatigue. A conductor strand made of three intertwisted wires is not particularly subject to either transverse or torsional vibration, although it still has some tendency to vibrate either transversely or torsionally. Other standard constructions, such as 7, 19, etc., wire strand constructions, begin to approach round wire in contour and, therefore, are to a more or less degree subject to the tendency to vibrate transversely in the wind. It is for these reasons that the three-wire conductor strand is generally used for rural electrification purposes.

Because of electrical reasons, these three-wire conductor strands are made with one or two of the wires of copper and with the remainder of the wires of steel, or with one or two of the wires of low carbon steel and with the remainder of the wires of high carbon steel. Sometimes all three of the wires have copper outer surfaces.

The present invention is based on the discovery that when a three-wire conductor strand of the type under discussion is placed in service and vibrated even slightly by the wind, the individual wires move relative one another, both sliding and rotating relative one another. Furthermore, the present inventor has found that, due to the length of the spans and the tension loads common in rural electric transmission lines, the copper-surfaced wires in particular have such a high coefficient of friction between their relatively moving surfaces as to result in an action consisting of a series of gripping and releasing actions, the result being a chattering. This imparts a new vibration to the various wires, it consisting of a very high frequency movement and being sufficient to cause hitherto unexplainable fractures in the wires subject to this action.

This damaging high frequency vibration, resulting from the chattering of the wires of a three-strand conductor sliding or turning relative one another when the conductor is strung under heavy tension in a long span, can be practically eliminated by placing a layer or film of metal between the various wires, which metal has a lower coefficient of friction than the metal from which the wires are made. The vibration effects, here discussed, are particularly prone to occur in the case of copper-surfaced wires, as previously mentioned, and in such instances this vibration can be completely eliminated for all practical purposes by placing a layer of zinc between the intercontacting or relatively moving surfaces of the various wires. This effect results from the zinc acting as an antifriction film or layer on which the copper surfaces slide and turn smoothly and without chattering as the strand vibrates in the wind.

A specific example of the foregoing is illustrated by the accompanying drawing in which:

Figure 1 schematically represents a rural electric transmission line; and

Figure 2:
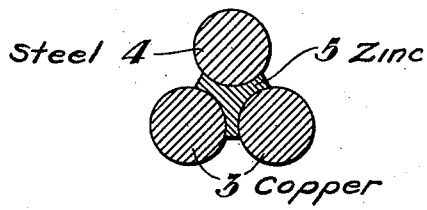
Figure 3:
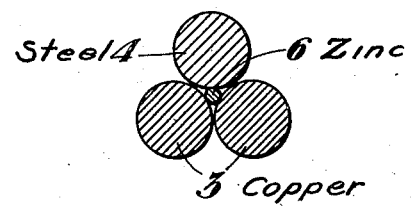
Figure 4:
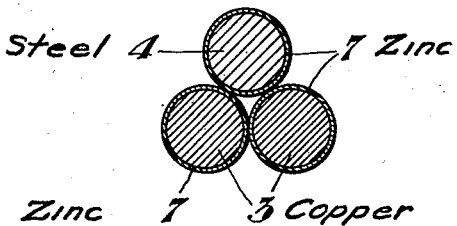

Figures 2, 3 and 4 show cross sections of various examples of a three-wire electric transmission line conductor embodying the principles of the present invention.

More specifically, Figure 1 shows two of the poles 1 of a rural electric power transmission line with one of the conductor strands 2 suspended by these poles in the form of a long catenary span, the flatness of the span being achieved by applying relatively high tension to the conductor strand. Even though of the three-wire conductor strand type, the conductor 2 is prone to vibrate both transversely and torsionally when subjected to the effects of a wind or breeze.

Due to the length of the span and the tension on the conductor strand, the various wires tend to relatively move both rotatively and longitudinally, and since the wires bear heavily together, this normally causes the creation of high frequency vibration within the various wires when one or more are made of copper, by reason of the copper surface or surfaces chattering. This action may be compared to the chattering of a worn brake band on an automobile or, more properly, to the shrill screetching of an unlubricated bearing.

In Figure 2, the wires 3 are made of copper while the wire 4 is made of high tensile strength steel. The intercontacting surfaces of these wires are pressed very tightly together when the strand they comprise is strung under heavy tension, this resulting from the constricting action which follows from their intertwisted relationship and the tendency of each wire to straighten when tensioned.

To avoid the chattering or vibration created as these wires slide relative one another, a saddle wire 5, made of zinc, is positioned inside the three wires 3 and 4, this saddle wire separating the various wires and providing zinc bearing surfaces on which they have been found to glide smoothly and without chatter. The result of this construction is a three-wire conductor strand which may be strung in long spans under heavy tensions and which, when vibrated by the wind, will not rapidly destroy itself through fatigue failure resulting from high frequency vibration created by the various copper wires sliding and turning relative one another.

In Figure 3, the copper wires 3 and steel wire 4 are laid with a zinc wire 6 in their interstices. In this case, the zinc wire functions to coat a very thin film of zinc on the various wires when the conductor strand is exposed to the weather, this film of zinc being effective to lubricate the three wires so that they relatively move smoothly and without chattering, soon after the conductor strand has been placed in service. This action is not obtained at first but it is obtained soon enough to prevent premature destruction of the conductor strand.

In Figure 4, each of the three wires, including the copper ones, is covered with a layer of zinc 7, this functioning to perform the same service already described.

Fatigue failures normally start at depressions in the surface of the vibrated part. Conductors of the type dealt with here when constructed according to the prior art and strung as described, tend to wear locally so as to cause the appearance of depressions. Since the lubricating zinc between the wires functions to retard wear by virtue of its action, the formation of depressions in the wires of a rural electric power line embodying the principles of the present invention is prevented to a large extent. This, in conjunction with the absence of chattering, results in a conductor strand having a remarkably long service life.

It is to be understood that the cable may be made with two steel wires and one copper wire. To effect an illustration of such a construction, reference may be made to any of Figures 2 through 4 with the understanding that in this instance the wires 3 are to be considered as made of steel, while the wire 4 becomes the copper wire.

I claim:

An overhead electric transmission line of the type consisting solely of three relatively movable intertwisted wires with at least one of the wires made of copper and the remainder made of steel, and which is suspended in a span of sufficient length under sufficient tension to urge the mutually opposed wire portions together with great force and to cause them to relatively move when the span is subjected to wind force, each of said wires being individually coated with a zinc layer, the mutually opposed wire portions being in each instance supported apart on said zinc layers and being in each instance relatively movable thereon so when the span is subjected to wind force, each of these portions moves on its zinc layer relative thereto, the zinc layer lubricating the portion moving thereon so it moves smoothly to diminish vibration of the type produced by the portions when relatively moving in direct contact, and so as to reduce local wear causing local wire depressions initiating fatigue failure thereof.

THOMAS F. PETERSON.